March 5, 1963
C. S. GLENNY
3,080,100
BICYCLE BASKET
Filed June 4, 1959
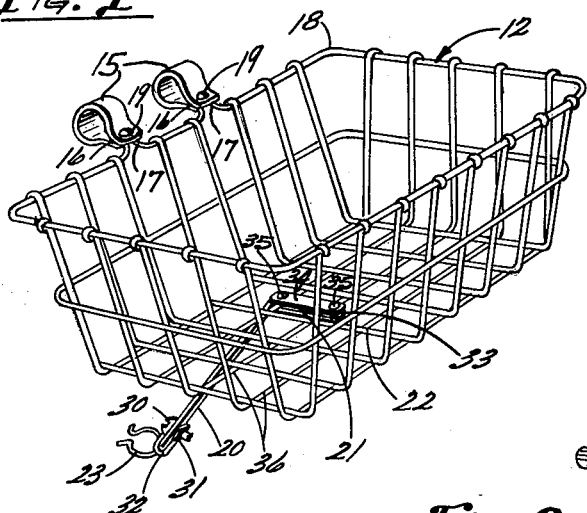
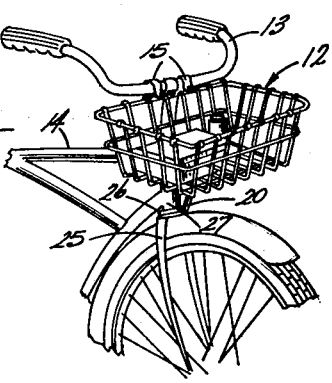
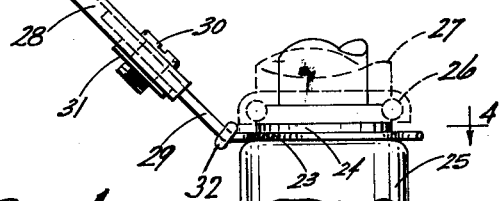
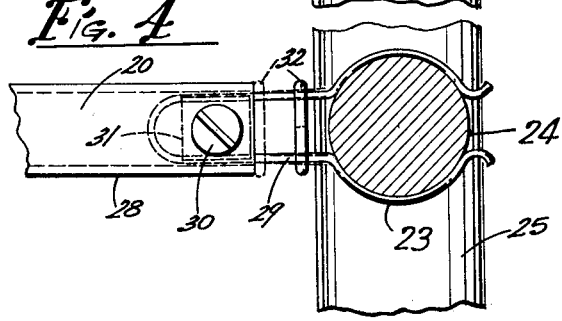
INVENTOR
CLARENCE S. GLENNY
ATTORNEY

United States Patent Office 3,080,100
Patented Mar. 5, 1963

3,080,100
BICYCLE BASKET
Clarence S. Glenny, Rockford, Ill., assignor to The Washburn Company, Worcester, Mass., a corporation of Massachusetts
Filed June 4, 1959, Ser. No. 818,076
1 Claim. (Cl. 224—36)

This invention relates to bicycle baskets.

The principal object of my invention is to provide a low cost, light weight, but sturdy basket designed for easy rigid three-point attachment to bicycles of various styles and makes, using two spring clamps on the handlebar attached to the rear upper portion of the basket similarly as disclosed in my Patent No. 2,805,806, issued September 10, 1957, and using a brace adjustably secured at one end to the bottom of the basket and carrying on its other end an elongated U-shaped flexible resilient wire connector in the form of a split ring or fork that is adjustably extensible relative to the brace and adapted to rest on top of the front fork and be snapped onto the cylindrical portion thereof under the head of the frame to support the basket with maximum rigidity under all anticipated operating conditions.

According to my invention, the brace which has its main part formed from a single strip of sheet metal that may be bent to the required included angle for attachment at its front end to the bottom of the basket has the lower rear end portion thereof bent to channel shape to receive an elongated U-shaped attaching shank portion of said connector that is integral with and bent upwardly from the split bearing ring or fork that rides on top of the front fork, the channel closely receiving the U-shaped shank for a slidable adjustable connection, so that only a single bolt is necessary to clamp the parts in adjusted relationship once the elevation of the bottom of the basket in relation to the top of the front fork has determined the overall length of brace needed and hence the extent to which the split ring or fork must be extended. A wire closure ring slidable on the U-shaped attaching shank of the split ring or fork where it forms the extension behind the brace is adapted to be slid rearwardly on said shank toward the split ring or fork to close the latter more tightly onto the cylindrical portion of the front fork, this being especially important where the shank is extended to an extreme position relative to the rear end of the brace.

The invention is illustrated in the accompanying drawing, in which—

FIG. 1 is a perspective view of a bicycle basket made in accordance with my invention;

FIG. 2 is another perspective view on a smaller scale, showing the basket in use on a bicycle, and FIGS. 3 and 4 are two views of the split spring wire bearing ring or fork showing how it snaps onto the cylindrical portion of the front fork and has adjustable connection with the adjacent end of the sheet metal brace.

The same reference numerals are applied to corresponding parts throughout the views.

Referring to the drawing, the basket designated generally by the reference numeral 12 is shown in FIG. 2 attached to the handlebar 13 of a bicycle 14 by means of a pair of spring clamps or clips 15, the spaced end portions 16 of which receive therebetween the generally U-shaped projections 17 bent from the back portion of the wire top frame 18 of the basket in substantially coplanar relationship to one another and in laterally spaced relation on opposite sides of the middle portion of the back wall of the basket, so that when the bolts 19, which pass through the U-shaped projections 17 and through registering openings in the spaced end portions 16 of the clamps 15, are tightened to fasten the clamps against turning with respect to the handlebar 13 the basket 12 is also fastened rigidly between the spaced end portions 16, similarly as disclosed in my earlier Patent No. 2,805,-806, mentioned above. In that patent the basket is braced by abutment with the handlebar clamp, but in the present case the brace 20 provided under the basket is adjustably clamped at one end, as at 21, to the bottom wall 22 of the basket, and has a split bearing ring or fork 23 forming a part of my improved elongated U-shaped flexible resilient wire connector adjustably mounted on the other end of the brace for extensibility to whatever extent may be required and snapped onto the cylindrical portion 24 on the upper end of the front fork 25 so as to rest on top of said fork for rigid support of the basket under all anticipated operating conditions. The bearing 26 for the front fork on the lower end of the head 27 on the front end of the frame leaves ample room under it for the split bearing ring or fork 23 to turn relative to said head with the front fork in the steering of the bicycle.

The brace 20 is of channel form, as clearly appears in FIGS. 1, 3 and 4, the longitudinally extending side flanges 28 lending the desired strength and rigidity while the trough of the channel also provides room for the elongated U-shaped shank 29 on the split ring or fork 23 for slidable adjustment of the one part with respect to the other before the bolt 30 is tightened in the nut 31 to clamp the parts in adjusted relationship, the nut 31 fitting closely between the flanges 28 and overlapping the two sides of the shank 29, as clearly appears in FIG. 4, so that the nut is held against turning and also clamps the shank 29 securely in any position of adjustment. Thus, when a longer brace is needed, the shank 29 is adjusted to extend farther out from the lower rear end of the brace 20, and vice versa when a shorter brace is required. A wire closure ring 32 closely surrounds the shank 29 and is slidable thereon away from the rear end of the brace 20 toward the split ring or fork 23 to close it more tightly than it would otherwise be on the cylindrical portion 24 on the front fork 25, this being especially important where the shank has been extended fairly far relative to the rear end of the brace 20. That portion of the shank 29 projecting from the brace 20 will usually, as indicated in dotted lines in FIG. 4, have the two legs thereof disposed in forwardly diverging relation before the ring 32 is moved forwardly from the dotted line position shown in FIG. 4 to the full line position, and in that way the ring 32 assures a tight hold of the split ring 23 on the cylindrical portion 24 on the front fork 25, and the resilience of the wire of the connector plays an important part in keeping the closure ring 32 from shifting rearwardly once it has been properly adjusted.

The horizontally bent upper end portion 33 of the brace 20 is flat and bears against the bottom 22 of the basket, and there is a cooperating elongated top plate 34 which bears against the bottom wall 22 of the basket from above, and bolts 35 are entered in holes in the opposite ends of plate 34 and through registering holes in the end portion 33 of brace 20 and receive nuts on the protruding lower end portions thereof to clamp the bottom wall of the basket firmly between the two parts when the bolts are tightened. The bolt holes in the plate 34 and brace portion 33 are spaced a little farther apart than the longitudinally extending wires 36 in the bottom wall 22 of the basket so that any two wires in the bottom wall 22 may be selected for cooperation with the clamp assembly 21, and there is, furthermore, a certain amount of fore and aft adjustability of the clamp assembly 21 possible in any selected location, so that regardless of how high or low the handlebar 13 happens to be set, and regardless of the inevitable difference in head dimensions at 27 on different makes and models of bicycles there is certain to be sufficient adjustability of the brace 20 to fit any given requirements. The end portion 33 of the brace 20 can be bent upwardly or downwardly a trifle to increase or decrease the included angle with respect to the channel-shaped main body portion of the brace to adapt the brace to the basket according to the elevation thereof with respect to the top of the front fork. The springiness of the wire used in the split ring 23 allows the shank 29 to flex the small amount necessary to suit the angle of the brace 20.

The application of the basket to the bicycle is so easy a youngster should have no difficulty in attending to the matter himself in most cases and do a good job of it, and most purchasers much prefer the neater appearance which the present brace assembly gives in contrast to the old style ones that fastened onto the legs of the front fork or onto the opposite ends of the front axle.

It is believed the foregoing description conveys a good understanding of the objects and advantages of my invention. The appended claim has been drawn to cover all legitimate modifications and adaptations.

I claim:

A bicycle basket support for adjustably connecting the substantially horizontal bottom of a bicycle basket with a vertical cylindrical portion on a bicycle front fork disposed below and behind the basket, said support comprising an elongated channel brace element disposed in rearwardly and downwardly inclined relation to the bottom of said basket and connected at its upper end to said basket, an elongated U-shaped flexible resilient wire connector fitting slidably in the lower portion of the channel of the brace for endwise adjustment relative to the brace and having the legs thereof projecting downwardly from the lower end of the brace to provide a length adjustment for said brace, a bolt on the brace at right angles thereto extending between the legs of the connector and connected with clamping means engaging said legs and arranged when tightened to clamp the connector in adjusted relationship to said brace, the lower end portions of said legs being bent into a substantially horizontal plane for straddling connection with the cylindrical portion on the front fork of said bicycle, these lower end portions of said legs being both bent to arcuate form to provide the opposite sides of a rearwardly opening split bearing ring of enlarged diameter relative to the width of said connector that is spreadable apart wide enough to first receive and then resiliently embrace the cylindrical portion of the bicycle front fork for support of the basket on the front fork, and an oblong closure ring closely surrounding the protruding end portions of the legs of said connector and slidable endwise thereof from a retracted position adjacent the lower end of said brace downwardly toward the split bearing ring to close the latter more tightly on the front fork and prevent displacement therefrom.

References Cited in the file of this patent

UNITED STATES PATENTS

| | | |
|---|---|---|
| 378,503 | Godfrey | Feb. 28, 1888 |
| 551,068 | Wilson | Dec. 10, 1895 |
| 736,416 | Medina | Aug. 18, 1903 |
| 753,082 | Lederman | Feb. 23, 1904 |
| 1,460,760 | McGee | July 3, 1923 |
| 2,010,479 | Dennis | Aug. 6, 1935 |
| 2,302,233 | Maddox | Nov. 17, 1942 |
| 2,541,640 | Dennis | Feb. 13, 1951 |

FOREIGN PATENTS

| | | |
|---|---|---|
| 288,118 | Switzerland | May 1, 1953 |